(12) United States Patent
Chandwani et al.

(10) Patent No.: US 7,424,666 B2
(45) Date of Patent: Sep. 9, 2008

(54) METHOD AND APPARATUS TO DETECT/MANAGE FAULTS IN A SYSTEM

(75) Inventors: Neelam Chandwani, Portland, OR (US); Udayan Mukheriee, Portland, OR (US); Santosh Balakrishnan, Gilbert, AZ (US); Rakesh Dodeja, Portland, OR (US); Chetan Hiremath, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 11/234,995

(22) Filed: Sep. 26, 2005

(65) Prior Publication Data

US 2007/0088974 A1 Apr. 19, 2007

(51) Int. Cl.
*G06F 11/00* (2006.01)
*H03M 13/00* (2006.01)
(52) U.S. Cl. .................................... 714/799
(58) Field of Classification Search ................ 714/746, 714/799, 25, 55
See application file for complete search history.

(56) References Cited

U.S. PATENT DOCUMENTS

| | | |
|---|---|---|
| 2004/0024659 A1 | 2/2004 | Tisson |
| 2004/0128372 A1 | 7/2004 | Mukherjee et al. |
| 2004/0260841 A1 | 12/2004 | Tisson |
| 2005/0125575 A1 | 6/2005 | Kuriappan |

OTHER PUBLICATIONS

Lu et al. Design the reasoning process of EDDM by Fuzzy rule-based method, 2004, IEEE International COnference on System, Man and CYbernetics, p. 2344-2349.*
Chen et al., REcovery Mechanism design for hot standby computer system, 2003, IEEE, p. 3027-3031.*

* cited by examiner

*Primary Examiner*—Shelly A Chase
(74) *Attorney, Agent, or Firm*—Daly, Crowley, Mofford & Durkee, LLP

(57) ABSTRACT

A fault module supports detection, analysis, and/or logging of various faults in a processor system. In one embodiment, the system is provided on a multi-core, single die device.

37 Claims, 15 Drawing Sheets

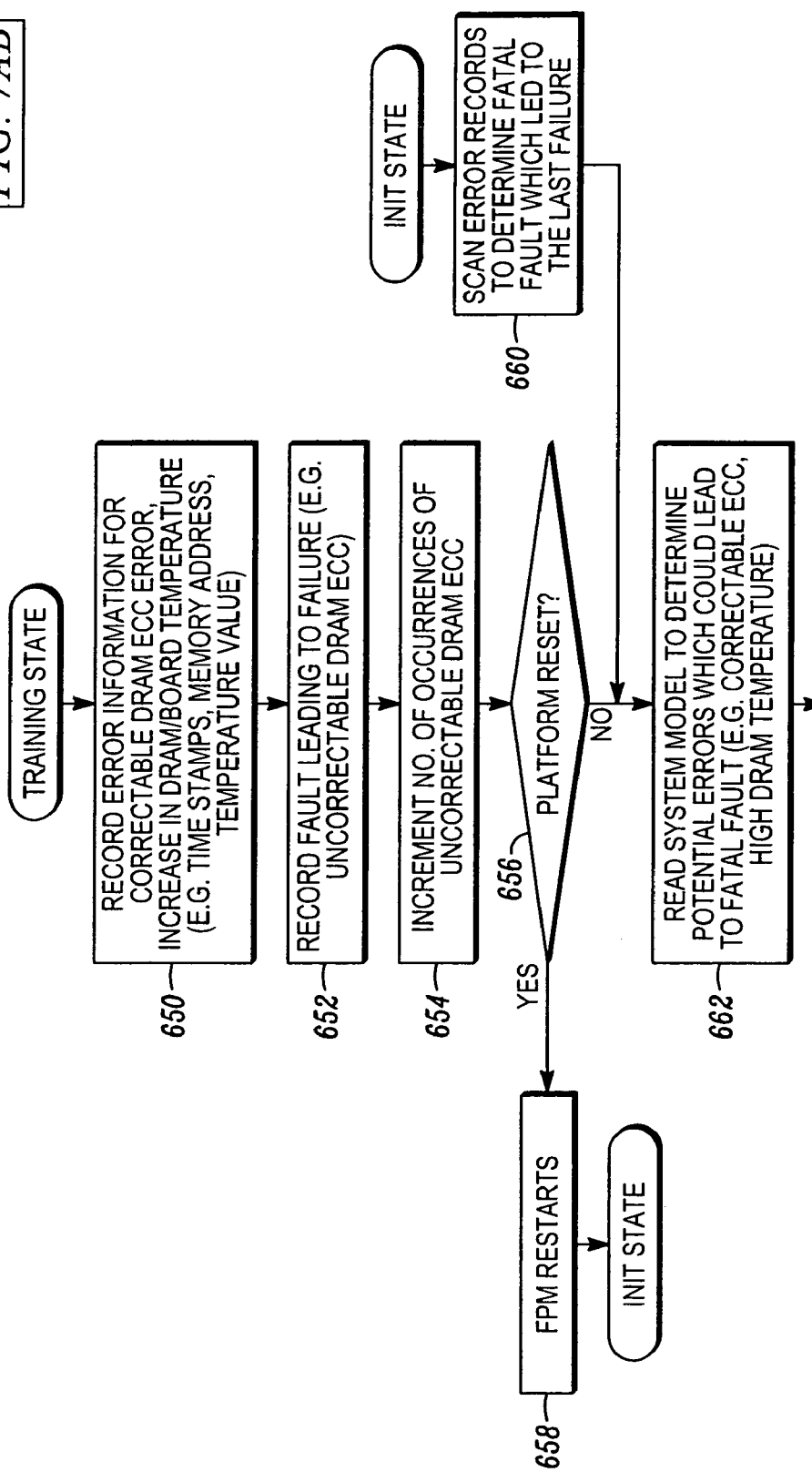

METHOD AND APPARATUS TO DETECT/MANAGE FAULTS IN A SYSTEM

BACKGROUND

As is known in the art, it is desirable to detect faults in a processor-based system. By detecting faults, operation of the system can be maintained and down time minimized. Some processor systems, including multi-core, single die systems, have limited functionality to detect faults.

BRIEF DESCRIPTION OF THE DRAWINGS

The exemplary embodiments contained herein will be more fully understood from the following detailed description taken in conjunction with the accompanying drawings, in which.

DETAILED DESCRIPTION

Figure 1:
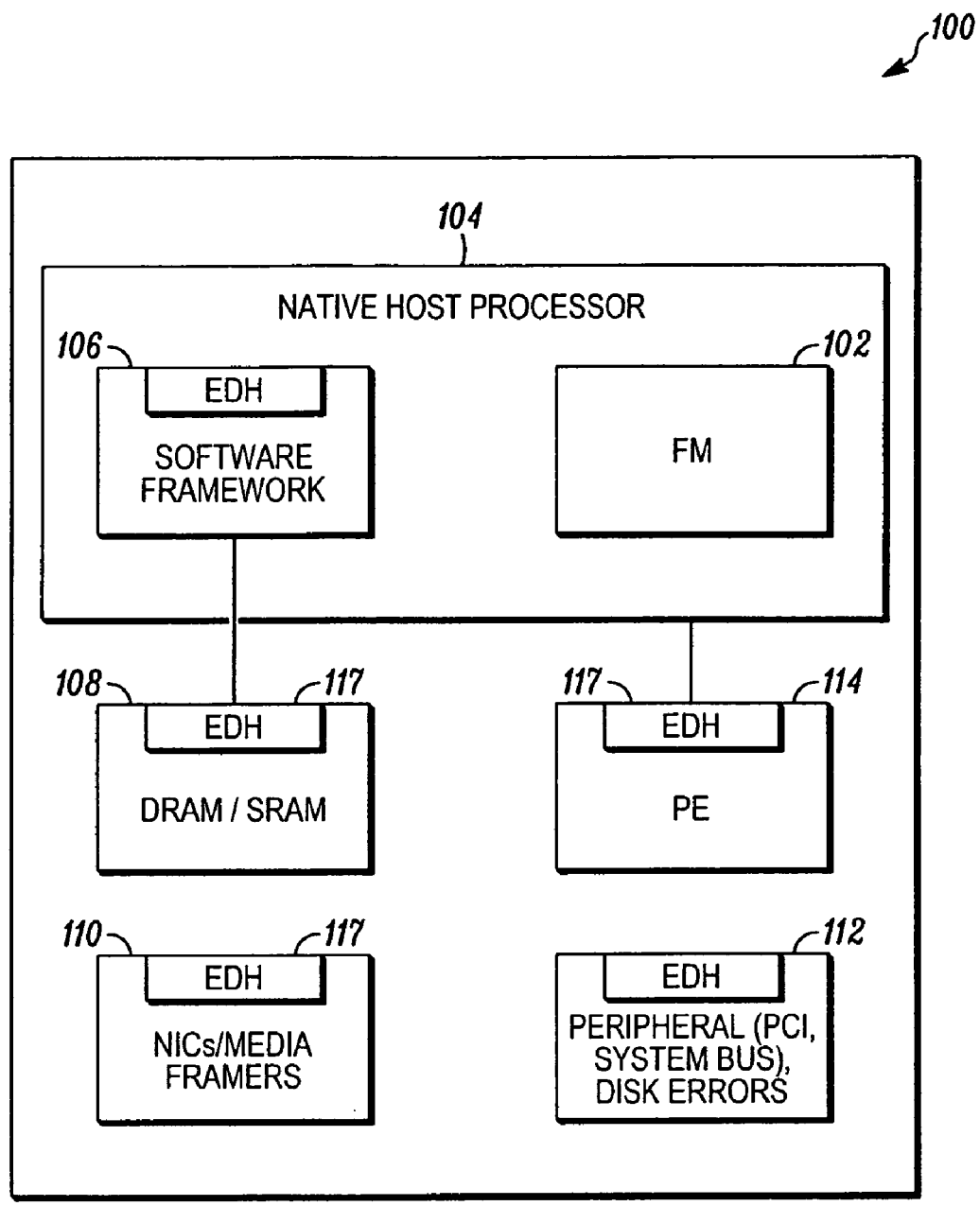
FIG. 1 is a block diagram of a system having a fault module on a host processor.

The acronyms listed below in Table 1 may be used herein.

TABLE 1

| Acronym | Description |
|---|---|
| | Acronyms |
| ATA | Advanced Technology Attachment |
| ATCA | Advanced Telecom Computing Architecture, also AdvancedTCA |
| ATM | Asynchronous Transfer Mode |
| API | Application Program Interface |
| BER | Bit Error Rate |
| BMC | Baseboard Management Controller |
| CAM | Content Addressable Memory |
| CLLI | Common Language Location Identification |
| CMM | Chassis Management Module. |
| CRC | Cyclic Redundancy Code |
| CSIX | Common Switch Interface |
| CSR | Control Status Register |
| DIMM | Dual In Line Memory Module |
| DRAM | Dynamic Random Access Memory |
| ECC | Error Correction Code |
| EDH | Error Detection Hook |
| EOP | End of Packet |
| FIFO | First In First Out |
| FM | Fault Module |
| FPGA | Field Programmable Gate Array |
| FRU | Field Replaceable Unit |

TABLE 1-continued

| Acronym | Description |
|---|---|
| | Acronyms |
| GigE | Gigabit Ethernet |
| GPR | General Purpose Register |
| GUI | Graphical User Interface |
| HDLC | High-Level Data Link Control |
| I2C | Inter-IC bus |
| IMA | Interactive Multimedia Association |
| IPMB | Intelligent Platform Management Bus |
| IPMC | Intelligent Platform Management Controller |
| IPMI | Intelligent Platform Management Interface |
| IPSEC | Secure Internet Protocol |
| LAN | Local Area Network |
| LOS | Loss of Signal |
| LPC | Low Pin Count |
| MAC | Media Access Control |
| MSF | Media Switch Fabric |
| NIC | Network Interface Card |
| NPE | Network Processing Element |
| OS | Operating System |
| PCI | Peripheral Component Interconnect |
| PE | Processing element |
| PHI | Platform Hardware Interface |
| PHY | Physical Interface |
| RBUF | Receive Buffer |
| RDRAM | Rambus DRAM |
| RMCP | Remote Management Control Protocol |
| ROM | Read Only Memory |
| SAS | Serial Attached Small Computer System Interface |
| SATA | Serial ATA |
| SNMP | Simple Network Management Protocol |
| SDH | Synchronous Digital Hierarchy |
| SMBus | System Management bus |
| SONET | Synchronous Optical Network |
| SOP | Start of Packet |
| SPI | Serial Peripheral Interface |
| SRAM | Static Random Access Memory |
| TBUF | Transmit Buffer |
| UART | Universal Asynchronous Receiver-Transmitter |
| UI | User Interface |
| WDT | Watchdog Timer |

Exemplary embodiments of the invention provide processor systems having a processor fault management module that can support fault detection, heuristics analysis, fault correlation and/or logging for a variety of fault types. In one embodiment, a processor system has multiple cores on a single die. Network processors having multiple processing engines is an example of this embodiment. Exemplary hardware to be monitored includes DRAM, SRAM, flash memory, scratch memory, processing engines, hash units, media framers, GigE links, coprocessors, disk drives and IPMC sensors. Illustrative errors include ECC, parity errors, processing engine watchdog, MSF errors, link errors, RBUF/TBUF overflow, L1/L2 cache errors, voltage/temperature changes, scratch ring overflows. Some examples of links are GigE, SONET/SDH, E1/T1. Some examples of link errors are Loss of signal, out of frame, Loss of clock, CRC, bad packet length. As an example, this processor system can be hosted on a blade, so-called 1U/2U rackmount server or any other computing platform.

The fault module can reside in a variety of locations based upon a particular processor system implementation, such as on a native host processor, a separate control processor, and/or a dedicated microcontroller. In general, the fault module has fault detection hooks defined and supported in processing engines, memory controllers, PCI units, framers, native control processor, and other components.

The fault module provides support of performing heuristic analysis on various hardware errors in order to predict potential failures ahead of time. In one embodiment of heuristic analysis, the fault module periodically monitors the rate of a given error occurring in the system and applies prediction mechanisms to determine whether the error has reached a critical point or not.

The fault module can also provide support for correlation of various errors detected and associate the errors with the status of various hardware components. Some examples of hardware components are blades, processing engines and links. In one embodiment, a blade can be a combination of various hardware components on an ATCA or cPCI form factor, for example, which can be inserted or extracted out of the chassis or shelf at runtime without impact to the other components. Another example of hardware component is a so-called 1U/2U server or any other computing platform having processor system.

In one embodiment, the fault module can also analyze the impact of detected errors in terms of severity level and recover from the faults detected. A fault logging feature of fault module supports reporting of errors to a management client in the form of alarms, logging of errors in persistent storage, and retrieval of logged errors.

The fault module communicates with local hardware units using interrupts, local bus (like UART, LPC, SMBus, IPMB, 12C), Ethernet, PCI or PCI-Ex and shared memory access (like SRAM/Scratch memory/DRAM).

In an exemplary embodiment, the fault module provides a configuration management API that allows a management client to configure various rules and policies: System topology information including resources discovered on a given blade, such as number of processing engines, number of memory channels, local sensors (e.g., voltage, temperature), disk drives, mezzanine cards, flash ROM units, I/O interfaces (GigE links, SONET/SDH links), PCI devices and their respective identities; Heuristics parameters like thresholds, time windows, error rates, conditional probabilities; correlation rules; and enabling and disabling of various types of fault detection.

In one embodiment, a fault module includes one or more of the following features: heuristic analysis including execution of various prediction mechanisms to predict a potential failure well ahead in time; correlation of various errors and status of affected resources, e.g., blade, Network Interface Card (NIC)/Network Controller, processing engines and I/O interfaces; detection of errors, such as hardware errors including DRAM Errors, sensors on the board, SRAM/Scratch memory errors, PCI Unit errors, MSF errors, general purpose processor errors, processing engine errors, coprocessor (e.g. crypto accelerator) errors, and hash units; Interface errors such as GigE link and NIC errors (e.g., CRC, FIFO overrun), SONET/SDH errors (like LOS, BER), and Fiber channel/SATA/SAS errors (like read/write, CRC); and software errors, such as sanctity of program code on processing engines, framework errors, fault logging and reporting, logging of errors detected and its related information, and logging and reporting of critical potential failures (i.e. result of predictive analysis)

FIG. 1 shows an exemplary system 100 having a fault module (FM) 102 running on a native host or control processor 104 in a blade. The fault module can also execute in a virtual partition created using virtual machine on native host or control processor. The native host or control processor can have one or more than one processing cores. A blade refers to circuit card in any form factor hosting various components like processors, processing engines (PEs), memory controllers, DIMMS, media interfaces, power regulators, sensors, management microcontroller. Examples of form factors include AdvancedTCA or cPCI based circuit cards. A software framework module 106 provides components to initialize data structures, process local destined packets and update tables used in the dataplane software executing on the processing engines and executes on native control processor of network processor. Various components are monitored by the fault module 102 including, in the illustrated embodiment, DRAM/SRAM interface module 108, NIC/Framer module 110, peripheral (e.g., PCI, media bus, disk errors, and IPMC) module 112, and processing engine module 114. Each component has an error detection hook (EDH) 117 to detect faults, as described in detail below.

In one embodiment, the fault module 102 executes on the native host processor 104 and uses following interfaces for accessing error information:
1. Interrupt lines and memory mapped error registers with memory controllers (SRAM and DRAM) and PCI units.
2. Interface (e.g., KCS/UART) to the local IPMC
3. Shared memory (e.g., SRAM/DRAM) between processing engines providing error information and native control processor
4. PCI/PCI-Ex or slow port for interfacing with NICs, Framers on Media Mezzanine cards, backplane/front panel GigE MAC and SATA/SAS controllers. It can also be potentially SMBus In other embodiments, the fault module executes on the dedicated management microcontroller and uses the following interfaces for accessing error information:
1. interface to the host agent executing on the native host processor (e.g. UART, PCI). Host agent provides access to the shared memory (e.g. SRAM/DRAM), interrupt lines with memory controllers (SRAM and DRAM) and media mezzanine cards (e.g. GigE, SONET/SDH).
2. interface (e.g., KCS/UART) to the local sensors and event logs
3. SMBus interface to NICs, Media mezzanine cards. This interface can also be used to extract error information from memory controllers.

Figure 2:
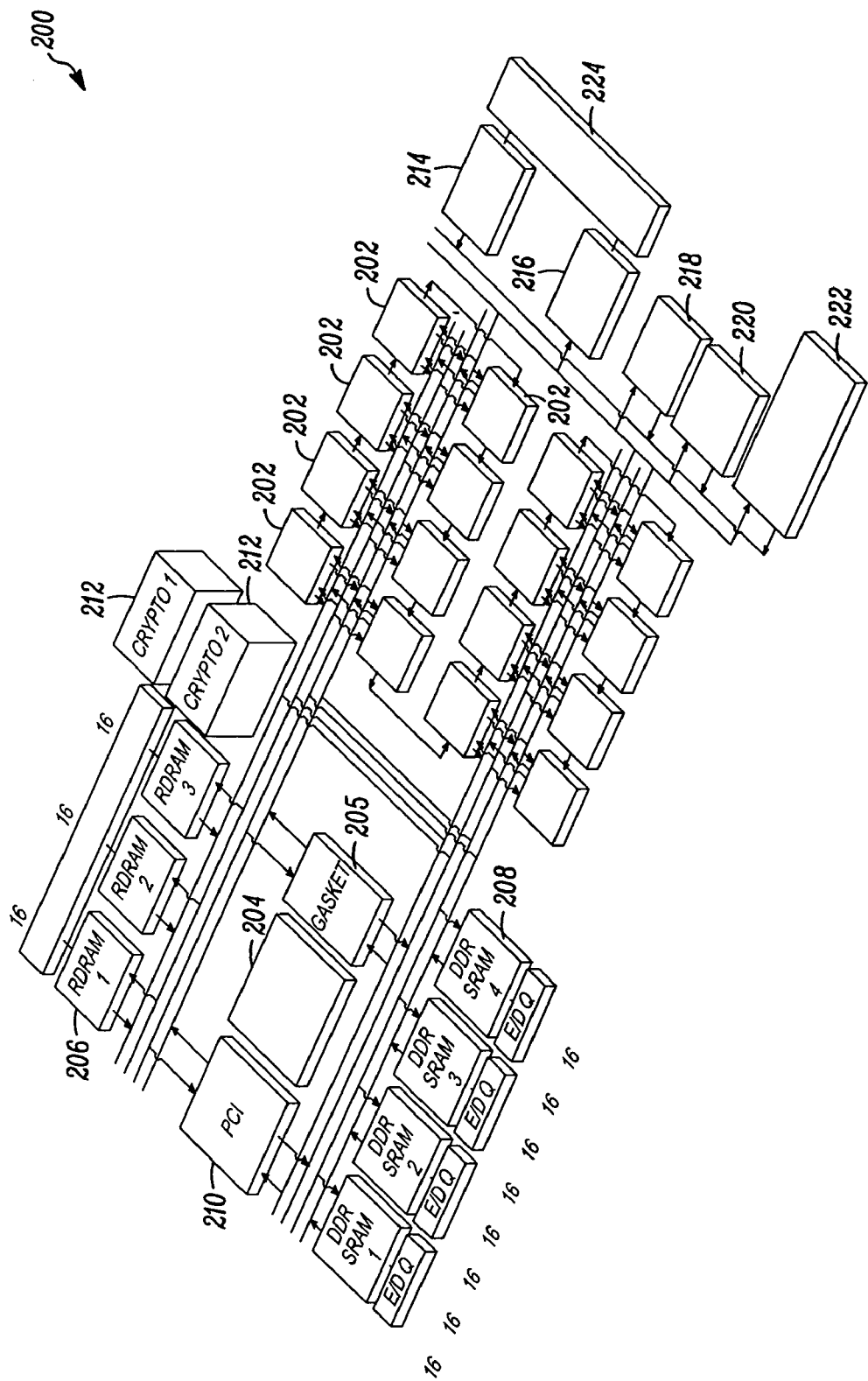
FIG. 2 is a block diagram of network processor having a fault module.

FIG. 2 shows an exemplary network processor 200 shown as a multi-core, single die network processor having a series (sixteen are shown) of processing engines 202 and a native control processor 204 having a fault module 205. The processor 200 further includes DRAM 206 and SRAM 208 and a PCI module 210. This processor further includes crypto elements 212 along with receive and transmit buffers 214, 216. A hash unit 218 and scratch ring module 220 are also provided along with a configuration and status register 222 module. An SPI/CSIX module 224 coupled to the receive and transmit buffers 214, 216 is also provided.

Figure 2A:
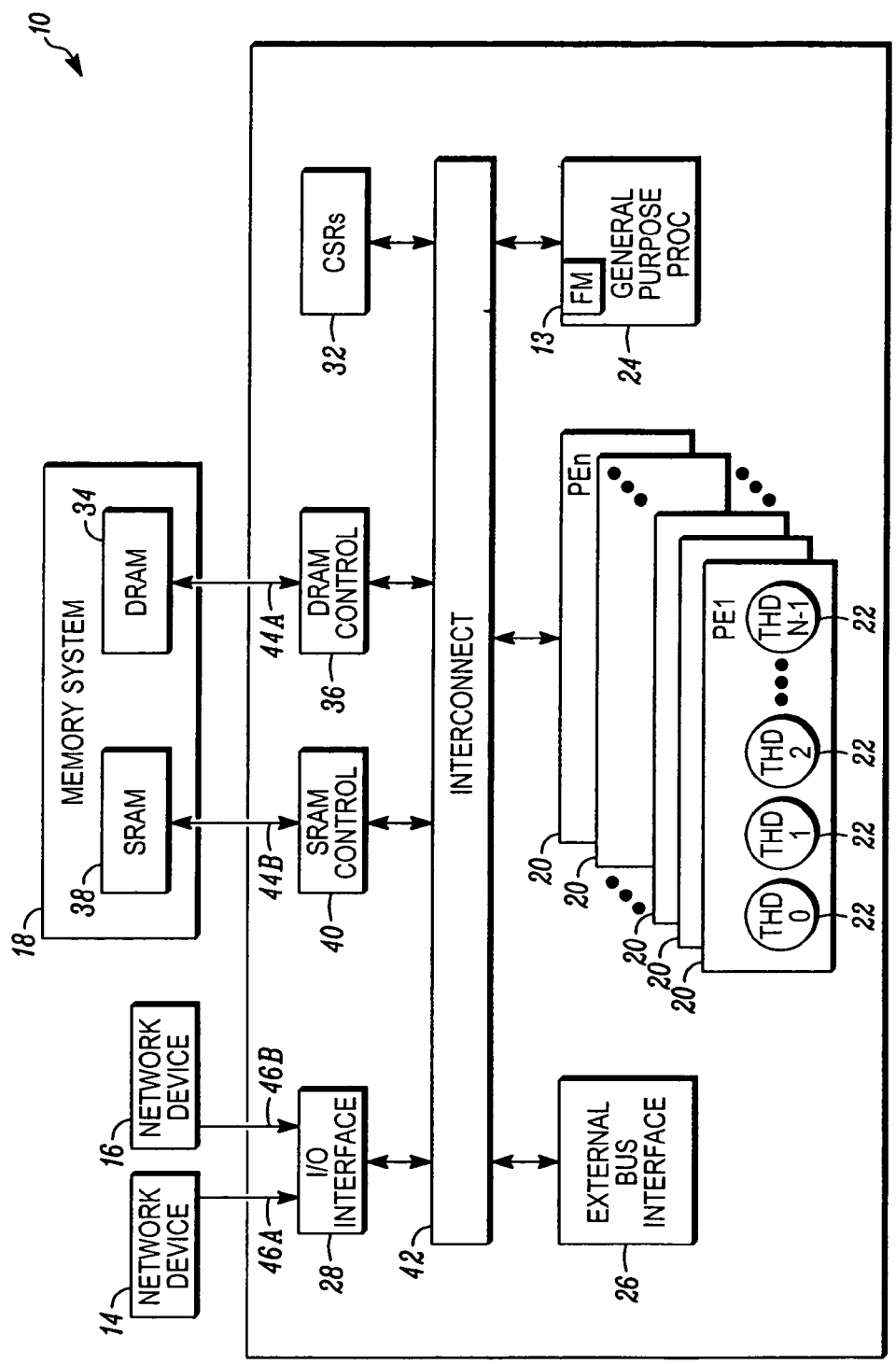
FIG. 2A is a schematic diagram of an exemplary network processor having a fault module.

FIG. 2A shows a further exemplary multi-core, single die processor system 10 including a processor 12, which can be provided as a network processor, including a fault module (FM) 13 which can have some similarity with the fault module of FIG. 1. The processor 12 is coupled to one or more I/O devices, for example, network devices 14 and 16, as well as a memory system 18. The processor 12 includes multiple processors ("processing engines" or "PEs") 20, each with multiple hardware controlled execution threads 22. In the example shown, there are "n" processing engines 20, and each of the processing engines 20 is capable of processing multiple threads 22, as will be described more fully below. In the described embodiment, the maximum number "N" of threads supported by the hardware is eight. Each of the processing engines 20 is connected to and can communicate with adjacent processing engines.

In one embodiment, the processor 12 also includes a general-purpose processor 24 that assists in loading microcode control for the processing engines 20 and other resources of the processor 12, and performs other computer type functions such as handling protocols and exceptions. In network processing applications, the processor 24 can also provide support for higher layer network processing tasks that cannot be handled by the processing engines 20.

The processing engines 20 each operate with shared resources including, for example, the memory system 18, an external bus interface 26, an I/O interface 28 and Control and Status Registers (CSRs) 32. The I/O interface 28 is responsible for controlling and interfacing the processor 12 to the I/O devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., in network applications, processing of payloads from network packets. In a networking implementation, the SRAM 38 and SRAM controller 40 are used for low latency, fast access tasks, e.g., accessing look-up tables, and so forth.

The devices 14, 16 can be any network devices capable of transmitting and/or receiving network traffic data, such as framing/MAC (Media Access Control) devices, e.g., for connecting to 10/100BaseT Ethernet, Gigabit Ethernet, ATM (Asynchronous Transfer Mode) or other types of networks, or devices for connecting to a switch fabric. For example, in one arrangement, the network device 14 could be an Ethernet MAC device (connected to an Ethernet network, not shown) that transmits data to the processor 12 and device 16 could be a switch fabric device (e.g. PCI-Express, Infiniband) that receives processed data from processor 12 for transmission onto a switch fabric.

In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also be serviced by the processor 12.

In general, as a network processor, the processor 12 can interface to various types of communication devices or interfaces that receive/send data. The processor 12 functioning as a network processor could receive units of information from a network device like network device 14 and process those units in a parallel manner. The unit of information could include an entire network packet (e.g., Ethernet packet) or a portion of such a packet, e.g., a cell such as a Common Switch Interface (or "CSIX") cell or ATM cell, or packet segment. Other units are contemplated as well.

Each of the functional units of the processor 12 is coupled to an internal bus structure or interconnect 42. Memory busses 44*a*, 44*b* couple the memory controllers 36 and 40, respectively, to respective memory units DRAM 34 and SRAM 38 of the memory system 18. The I/O Interface 28 is coupled to the devices 14 and 16 via separate I/O bus lines 46*a* and 46*b*, respectively.

Figure 2B:
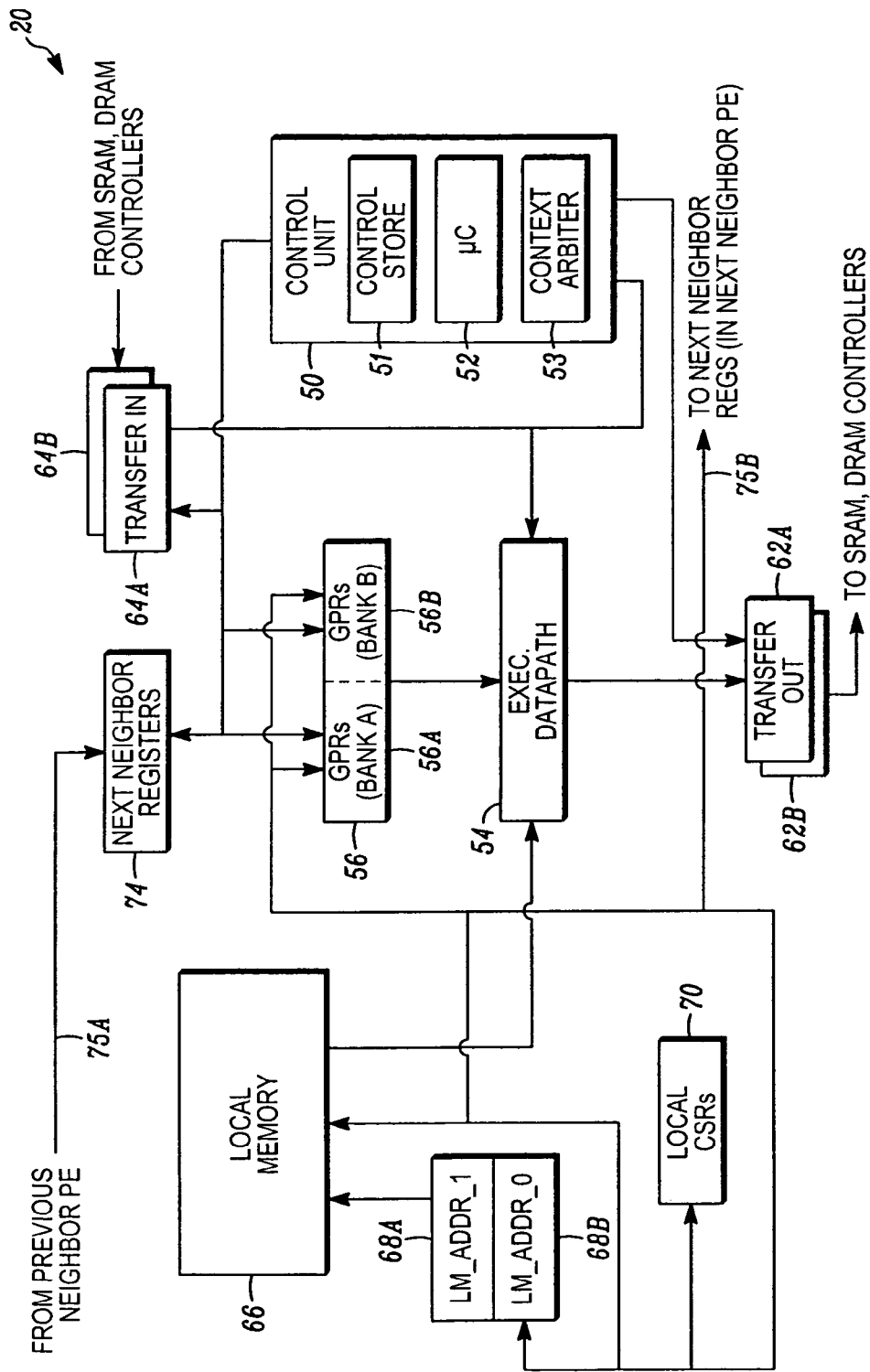
FIG. 2B is a diagram of an exemplary processing engine (PE) that runs microcode.

Referring to FIG. 2B, an exemplary one of the processing engines 20 is shown. The processing engine (PE) 20 includes a control unit 50 that includes a control store 51, control logic (or microcontroller) 52 and a context arbiter/event logic 53. The control store 51 is used to store microcode. The microcode is loadable by the processor 24. The functionality of the PE threads 22 is therefore determined by the microcode loaded via the core processor 24 for a particular user's application into the processing engine's control store 51.

The microcontroller 52 includes an instruction decoder and program counter (PC) unit for each of the supported threads. The context arbiter/event logic 53 can receive messages from any of the shared resources, e.g., SRAM 38, DRAM 34, or processor core 24, and so forth. These messages provide information on whether a requested function has been completed.

The PE 20 also includes an execution datapath 54 and a general purpose register (GPR) file unit 56 that is coupled to the control unit 50. The datapath 54 may include a number of different datapath elements, e.g., an ALU (arithmetic logic unit), a multiplier and a Content Addressable Memory (CAM).

The registers of the GPR file unit 56 (GPRS) are provided in two separate banks, bank A 56*a* and bank B 56*b*. The GPRs are read and written exclusively under program control. The GPRs, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The PE 20 further includes a write transfer (transfer out) register file 62 and a read transfer (transfer in) register file 64. The write transfer registers of the write transfer register file 62 store data to be written to a resource external to the processing engine. In the illustrated embodiment, the write transfer register file is partitioned into separate register files for SRAM (SRAM write transfer registers 62*a*) and DRAM (DRAM write transfer registers 62*b*). The read transfer register file 64 is used for storing return data from a resource external to the processing engine 20. Like the write transfer register file, the read transfer register file is divided into separate register files for SRAM and DRAM, register files 64*a* and 64*b*, respectively. The transfer register files 62, 64 are connected to the datapath 54, as well as the control store 50. It should be noted that the architecture of the processor 12 supports "reflector" instructions that allow any PE to access the transfer registers of any other PE.

Also included in the PE 20 is a local memory 66. The local memory 66 is addressed by registers 68*a* ("LM_Addr_1"), 68*b* ("LM_Addr_0"), which supplies operands to the datapath 54, and receives results from the datapath 54 as a destination.

The PE 20 also includes local control and status registers (CSRs) 70, coupled to the transfer registers, for storing local inter-thread and global event signaling information, as well as other control and status information. Other storage and functions units, for example, a Cyclic Redundancy Check (CRC) unit (not shown), may be included in the processing engine as well.

Other register types of the PE 20 include next neighbor (NN) registers 74, coupled to the control store 50 and the execution datapath 54, for storing information received from a previous neighbor PE ("upstream PE") in pipeline processing over a next neighbor input signal 76*a*, or from the same PE, as controlled by information in the local CSRs 70. A next neighbor output signal 76b to a next neighbor PE ("downstream PE") in a processing pipeline can be provided under the control of the local CSRs 70. Thus, a thread on any PE can signal a thread on the next PE via the next neighbor signaling.

While illustrative hardware is shown and described herein in some detail, it is understood that the exemplary embodiments shown and described herein are applicable to a variety of hardware, processors, architectures, devices, development systems/tools and the like.

Figure 3:
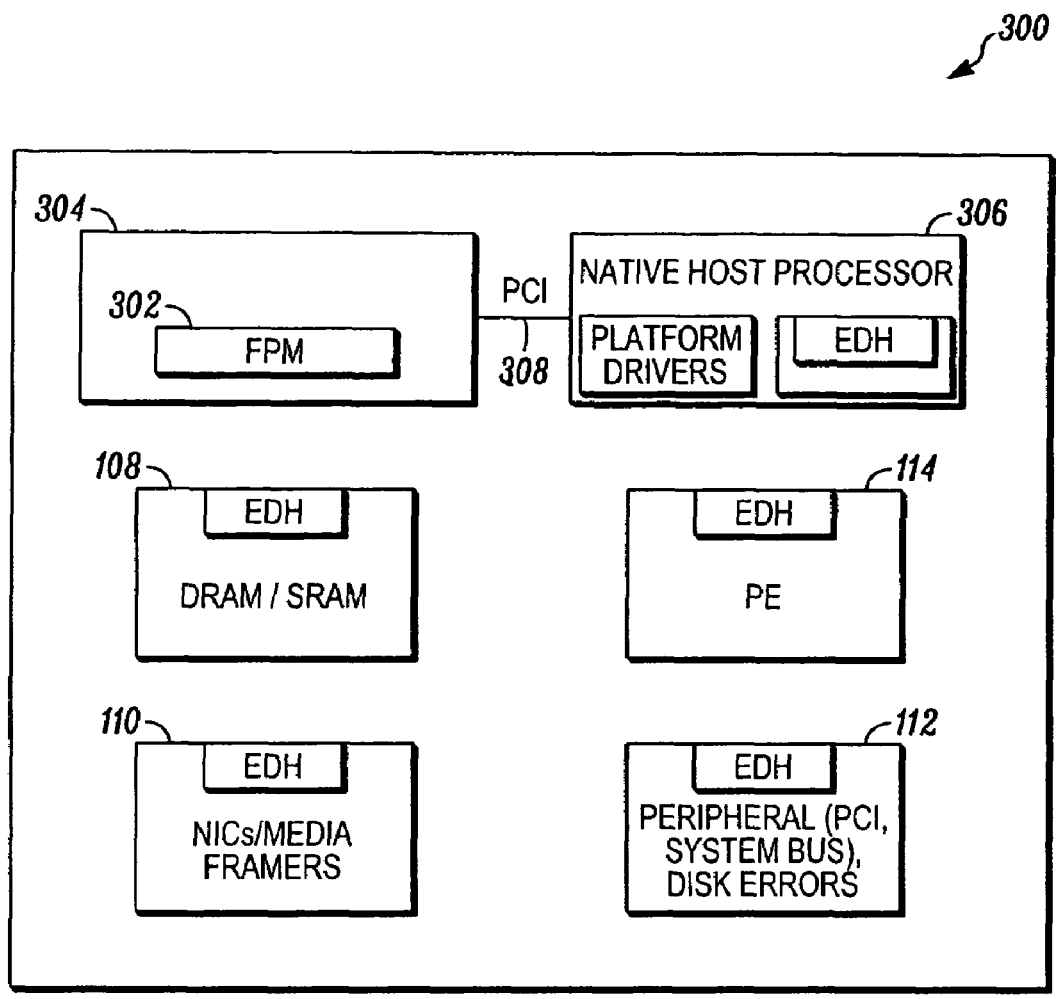
FIG. 3 is a block diagram of a system having a fault module on control processor.

FIG. 3 shows an exemplary processor system 300 having a fault module 302 on a separate control processor 304 coupled to a native host processor 306 via a bus 308, such as a PCI bus. In one embodiment, the processor system is provided as a multi-core single die device. FIG. 3 has some commonality with FIG. 1 where like reference numbers indicate like elements. In one embodiment, the separate control processor 304 is located on a processor mezzanine card. The control processor 304 can also be used for hosting signaling applications and middleware when the applications run out of bandwidth on the native control processor, for example.

In this configuration, the fault module 302 executes on the separate control processor 304 and uses I/O interfaces (e.g. PCI) 308 to access the various hardware units. Interrupt lines from memory controllers can still be terminated on the native host processor 306 and processing engines can use SRAM/scratch memory for storing error information (e.g. counters). Drivers executing on the native control processor 306 provide access to hardware units, such as memory controllers and processing engines.

Figure 4:
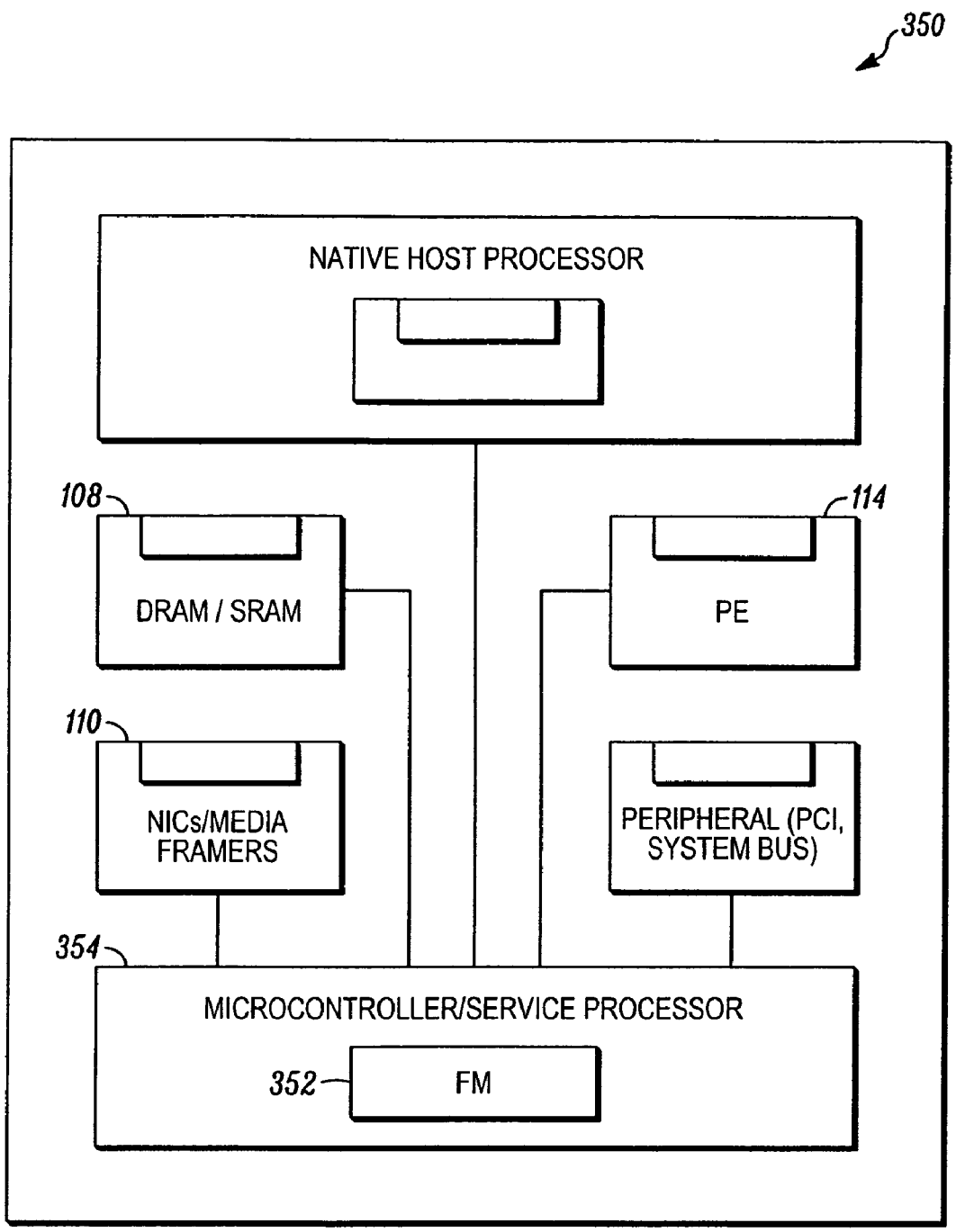
FIG. 4 is a block diagram of a system having a fault module on a microcontroller.

In another embodiment of a system 350 shown in FIG. 4, a fault module 352 is located on a dedicated service processor/microcontroller 354. The dedicated service processor/ management microcontroller 354 provides access to the local hardware components such as the native host processor, memory controllers, NICs, sensor devices, processing engines, media framers. The fault module uses the various interfaces of dedicated service processor/microcontroller to retrieve desired error information. Examples:

1. processing engines can update error information into the shared memory (SRAM/DRAM/Scratch). The fault module can provide software host agents residing on the native host processor to access the shared memory and send error information to the dedicated service processor/microcontroller.

2. NICs and media framers can provide out of band access (e.g. SMBus) of error registers to the fault module executing on the dedicated service processor/microcontroller.

3. Memory controllers can generate interrupts to inform memory errors to the dedicated service processor/microcontroller. Memory controllers can also provide out of band access (e.g. SMBus) to allow fault module executing on dedicated microcontroller to read error registers.

In this embodiment, the functionality to detect errors can execute on the appropriate hardware components and fault module can use agents/mechanisms to retrieve the error information. These agents/mechanisms can be a software host agent or interrupts or SMBus.

Figure 5:
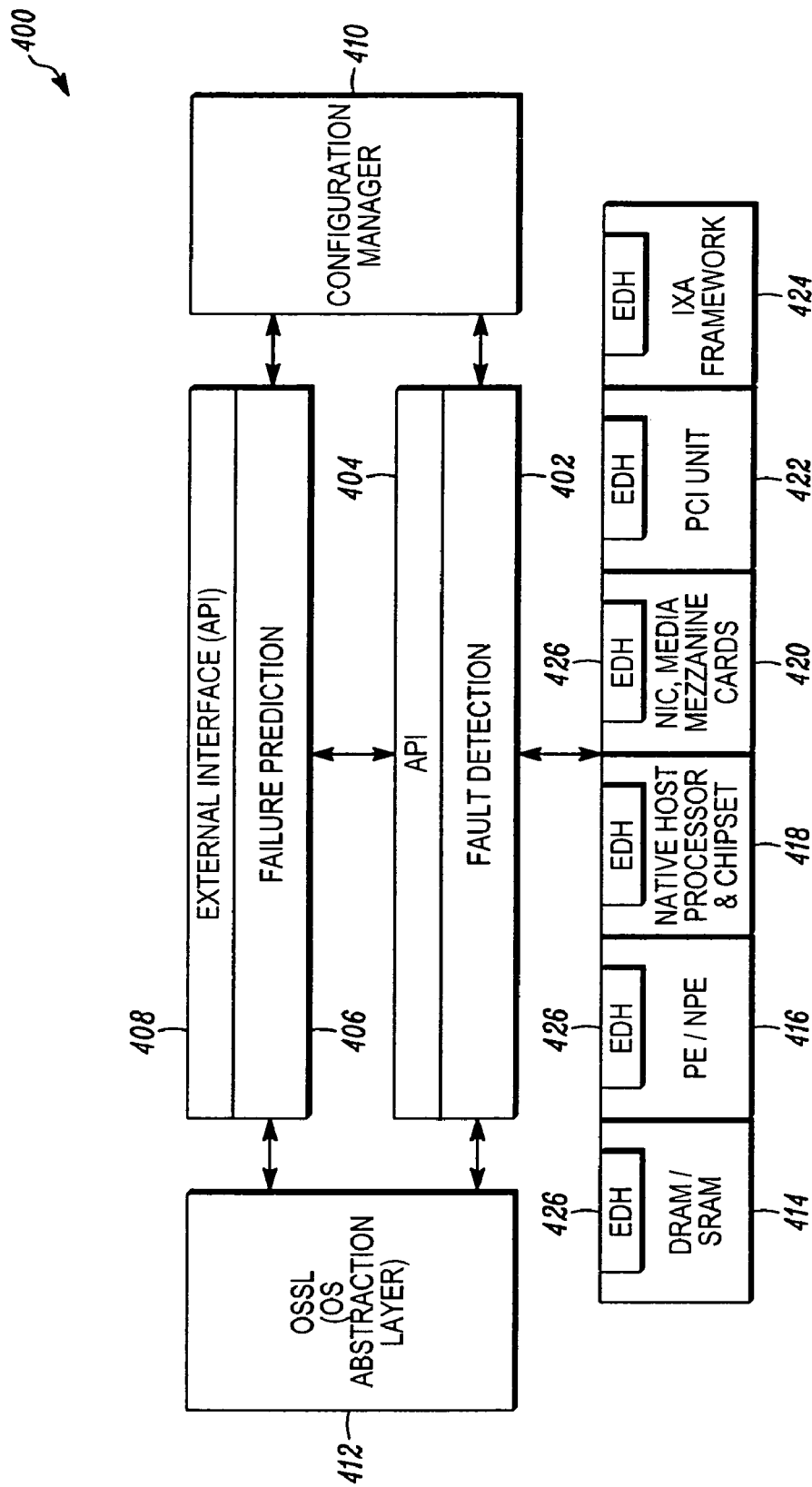
FIG. 5 is a block diagram of a fault module.

FIG. 5 shows a block diagram of an exemplary design of fault module 400 including a fault detection layer or module 402, which can include a fault detection API 404, and a failure prediction layer 406, which can include an external interface API 408. The failure prediction and fault detection layers are designed and implemented independent of type of operating system and use services of an OS Abstraction layer to achieve this functionality. They provide support for configuration of various rules, policies and parameters. Each of the monitored components includes an error detection hook (EDH). Illustrative components include DRAM/SRAM 414, processing engines/NPE 416, native host processor 418, NIC and media 420, PCI 422, and framework 424, each of which includes an error detection hook 426. The Intel IXA framework is an exemplary framework.

The fault detection layer 402 provides fault detection capabilities wrapped around errors that can occur in various hardware units and software components 414, 416, 418, 420, 422, 424. The fault detection layer 402 maintains the independence of the failure prediction layer 406 from the access mechanism required to get the error information from various sources. This enables the failure prediction layer 406 to be transparent to the usage model or configuration being used. It also provides the capability to report detected errors to the failure prediction layer 406 for heuristic analysis and logging, for example.

The fault detection layer 402 provides support of configuring what errors need to be monitored of various hardware components. In one embodiment, fault detection layer can provide support of configuring the resources or hardware components installed on a given blade. This layer can also provide support of default configuration.

It is understood that some of the hardware units, such as a hash unit, do not support in-built error detection mechanisms. For such hardware units, the fault detection layer 402 can use runtime diagnostics to detect errors. The diagnostics can be triggered by a management client on-demand and can be initiated internally.

Figure 6:
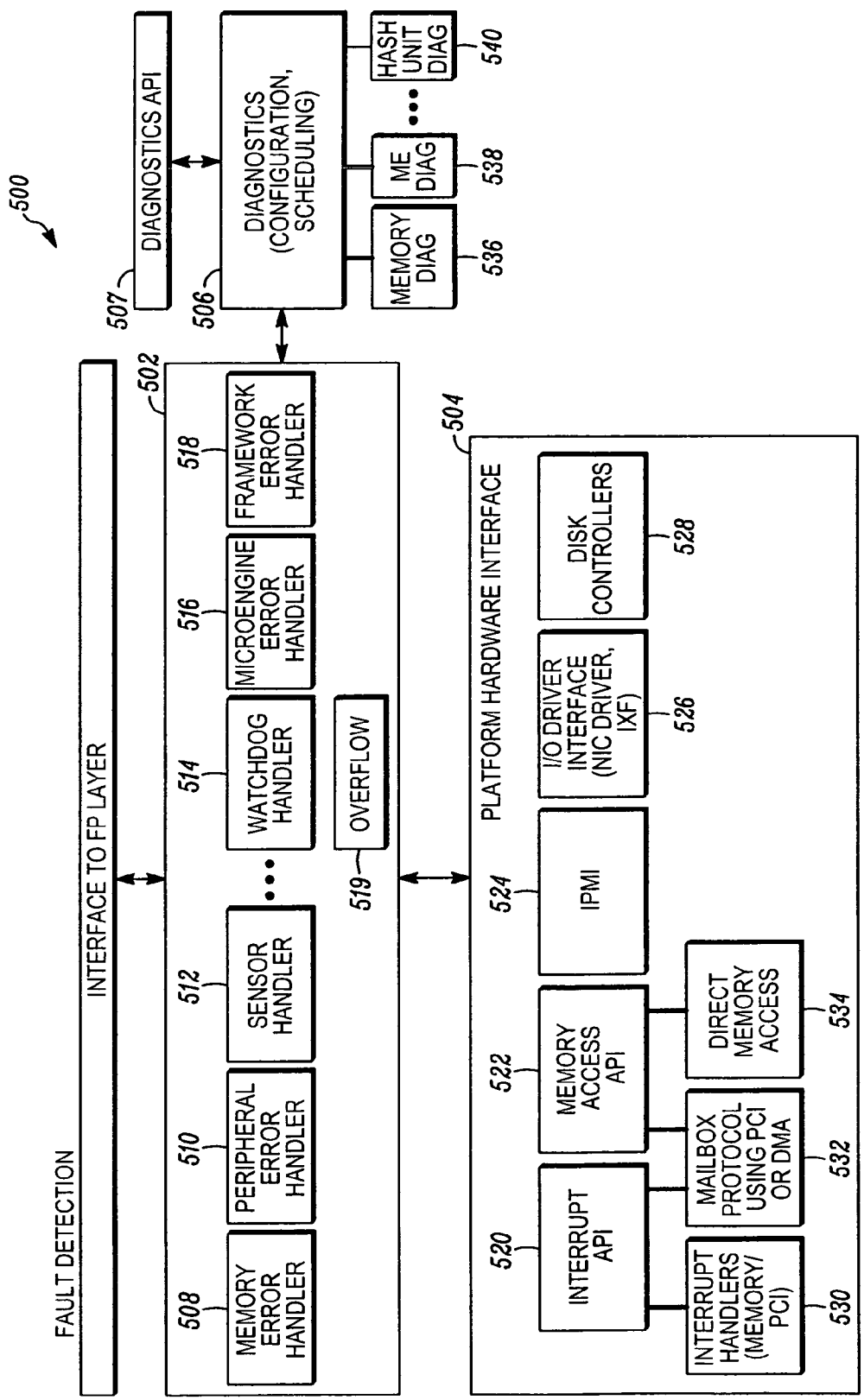
FIG. 6 is a block diagram of a fault detection layer.

FIG. 6 is a block diagram of an exemplary fault detection layer 500 having an error handler layer 502, a platform hardware interface layer 504 and a diagnostics layer 506. The platform hardware interface layer 504 is at the lowest level in the fault detection layer 500. Exemplary error handlers in the error handler layer include a memory error handler 508, a peripheral error handler 510, a sensor error handler 512, a watchdog timer error handler 514, a processing engine error handler 516, and a framework error handler 518. Illustrative interfaces in the platform hardware interface layer 504 include an interrupt API 520, a memory access API 522, IPMI access 524, an I/O Driver interface 526, a disk controller interface 528, an interrupt handlers 530, a mailbox protocol interface 532, and a direct memory access interface 534. Exemplary diagnostic modules include memory diagnostics 536, PE diagnostics 538, and hash unit diagnostics 540.

The platform hardware interface (PHI) layer 504 provides support for direct memory access, interrupt handling, APIs, PCI access, IPMC access and the like. The interrupt handler 530 processes the various interrupts generated by memory controllers, PCI Unit and MSF on detecting errors. Depending on the source of interrupt, interrupt handler 530 informs appropriate error handler. The memory access API 522 keeps the various fault handlers transparent of the mechanism by which memory can be accessed across various usage models, described above. Similarly the interrupt API 520 provides a transparent mechanism for fault handlers to receive the interrupt information from the blade e.g. interrupt lines could be shared or separate between different hardware units and host control processor.

The direct memory access interface 534 provides APIs to read and write memory, which can be shared between native host processor, processing engines and coprocessors. Examples of shared memory include SRAM, SDRAM, and scratch memory. The IPMI interface 524 provides access to local IPMC, which is accessed to get the status of various sensors (e.g., voltage, temperature, etc) and DRAM ECC errors. The I/O driver (e.g., NIC driver) interface 526 communicates with NICs, framers and/or MAC on media mezzanine cards as well as the backplane.

The error handlers in the error handler layer 502 provide handlers for various types of errors. The handlers monitor errors using polling mechanisms or proactive notifications from platform hardware interface (PHI) layer. In one embodiment, the error handlers maintain counts of errors reported, compare them with corresponding reporting thresholds, and store detailed error information. Error handlers report the errors and related information to the fault prediction layer 406 (FIG. 5) after crossing reporting thresholds.

The error handler layer 502 can include an event management module to provide a mechanism to enable failure prediction and other users to register for various fault events and receive the registered events in the form of callbacks. The event management module stores the user context for various fault events. The granularity of event registration could be memory errors, processing engine errors, PCI errors, etc.

The diagnostics layer 506 provides a mechanism to initiate diagnostics on various hardware components during runtime. The runtime diagnostics could be triggered under a variety of conditions. A management client can initiate using a diagnostics API 507 to invoke diagnostics during out of service state when there are no applications running. Diagnostics can be internally triggered on a periodic basis. Diagnostics can be triggered internally during idle time of a given resource.

The diagnostics layer 506 provides support of reporting failure of diagnostics as a fault event to error handlers in the error handler layer 502 and result of diagnostics to the user if registered via the diagnostics API. The diagnostics layer 506 can also be invoked by the failure prediction layer 406 (FIG. 5) if it requires to initiate a diagnostics as part of the analysis done on the fault reported.

The diagnostics layer 506 provides support of configuring 410 (FIG. 5) to allow provisioning and triggering conditions for diagnostics on various resources. For example, polling duration can be configured for hash units. The diagnostics layer 506 uses the platform hardware interface layer 504 for invoking tests on different hardware units, such as memory.

The memory error handler 502 provides support for enabling/disabling different types of memory errors, such as DRAM ECC, SRAM/MSG-SRAM parity, scratch parity, etc. It also provides support for storing configuration of memory resources installed on a blade. When a given memory error detection type is enabled, the memory handler 502 enable interrupts to allow memory controllers to report errors. For blades, the memory error handler 502 enables event reporting in IPMC for DRAM ECC errors. In case memory does not support an interrupt mechanism e.g. scratch, the memory error handler will enable a polling mechanism and interface with a memory access API to detect the memory errors.

The memory error handler 502 also monitors the frequency of interrupts and if interrupts are happening frequently, it will enable a polling mechanism and disable interrupts.

The watch dog error handler 514 provides support of monitoring sanctity of a given resource, such as processing engines, coprocessors and components of software framework. The watch dog module provides support for storing configuration of the resources to be monitored and a mechanism by which the watch dog error handler is enabled.

The watch dog error handler 514 can use a variety of monitoring mechanisms. Polling using shared memory assumes shared memory between the resource and watch dog handler and requires resources to increment a watch dog counter in the shared memory periodically. The watch dog error handler 514 provides support of configuring shared memory space to be used for this purpose.

For a polling mechanism, each resource is responsible for updating a watch dog counter in memory periodically. The watch dog error handler 514 provides support of reading this counter for each polling interval and provides a mechanism to start and stop monitoring sanctity of a given resource. The periodicity time interval shall be large enough to capture the maximum time a processing engine, for example, can take for processing a packet/cell keeping in mind the various line rates to be supported. For example, periodicity can be in the order of seconds as processing engine processing engine will typically take a few ms (for OC-12, 708 ns/cell) for processing a packet/cell to meet the line rate.

Processing engine packet processing blocks increment a watch dog counter each time it enters into a dispatch loop, for example.

NPEs can access SRAM memory that is common to the native control processor. NPE components will increment a given counter periodically. As noted above, an NPE can include a variety of coprocessors for different sub functions, such as Media Switch Fabric (MSF) processing, HDLC, IMA, IPSec features.

To use interrupt or separate watch dog pins, it is assumed that separate watch dog lines can be probed periodically by the resource to indicate its sanctity. The probing of watch dog lines generate an interrupt to the processor hosting fault module. The watch dog handler 514 restarts the timer on receiving the interrupt. On timeout, it declares this event as a watch dog timeout and informs higher layers.

On detecting a watch dog timeout event, the watch dog error handler 514 informs of the event to an upper layer. If a watch dog event persists for a configured recovery timeout, the handler recovers from the watch dog failure.

The peripheral error handler 510 provides the capability of detecting errors in the NIC, MSF, SONET/SDH framers, Gigabit Ethernet links and interacts with the interrupt handler for errors directly reported by MSF and PCI units. The peripheral error handler 510 also uses the services of NIC drivers to get error information related to links on the host processor. Some MSF errors are also detected by processing engines and it is expected that the processing engine will update appropriate error information in the memory.

The overflow detection handler 519 provides support for determining overload conditions for buffer resources being used in the framework, such as RBUF, TBUF, and packet buffers in buffer free list. The overflow detection handler 519 also monitors a receive FIFO overrun in a NIC using a polling mechanism to determine the overflow condition. The overflow detection module 519 compares the received overflow count in a given polling interval against the pre-configured threshold and generates an event to the user if threshold is exceeded.

For RBUF, the overflow detection module 519 can access the status registers in the MSF. For TBUF and buffer free list, the module can use components running on processing engines and the native control processor to update the overflow counters.

The framework error handler 518 provides support for monitoring software errors encountered in the framework components and informing the user. Monitoring is limited to polling the different severity level error counters incremented by various components in the framework. The error counters are maintained in shared memory between the framework and fault module.

The processing engine fault handler 516 provides support for determining faults within the processing engines by determining parity errors in control store. The handler 516 depends on the interrupt mechanism to allow the processing engine to inform of control parity errors.

The failure prediction layer 406 in FIG. 5 attempts to predict failures in advances of actual component failure. By providing failure prediction, action can be taken to prevent actual failures and reduce downtime.

Figure 7:
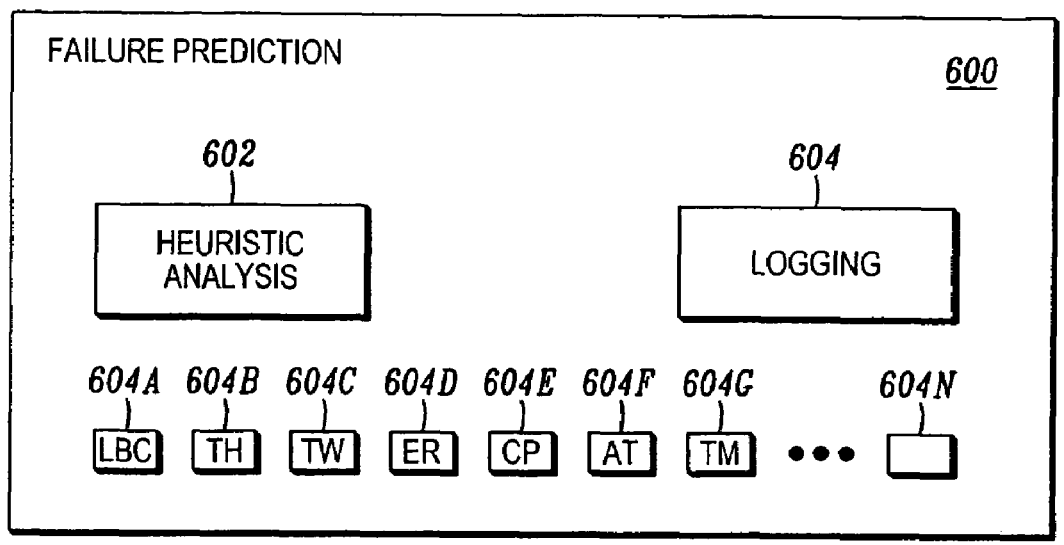
FIG. 7 is a block diagram of a failure prediction layer.

As shown in FIG. 7, the failure prediction layer 600 can include a heuristic analysis layer 602 implementing multiple prediction mechanisms 604a-N around various error types to predict failure of a given component. This layer provides heuristics algorithms which monitor various parameters like thresholds 604b, leaky bucket counters 604a, time windows 604c, error rates 604d, conditional probabilities 604e, adaptive training period 604f, and can predict potential failure well before it leads to system crash. These parameters are configurable for each error type and resource. This layer also provides training mechanisms 604g for identifying error(s) that cause critical failures and associated heuristics parameters so that they can be predicted at run time, by looking at the symptoms. The failure prediction layer 600 reports potential component failures to a management client, for example, and information related to the failures. The failure prediction layer 600 can also initiate diagnostics under the control of the prediction mechanism.

Figure 7A:
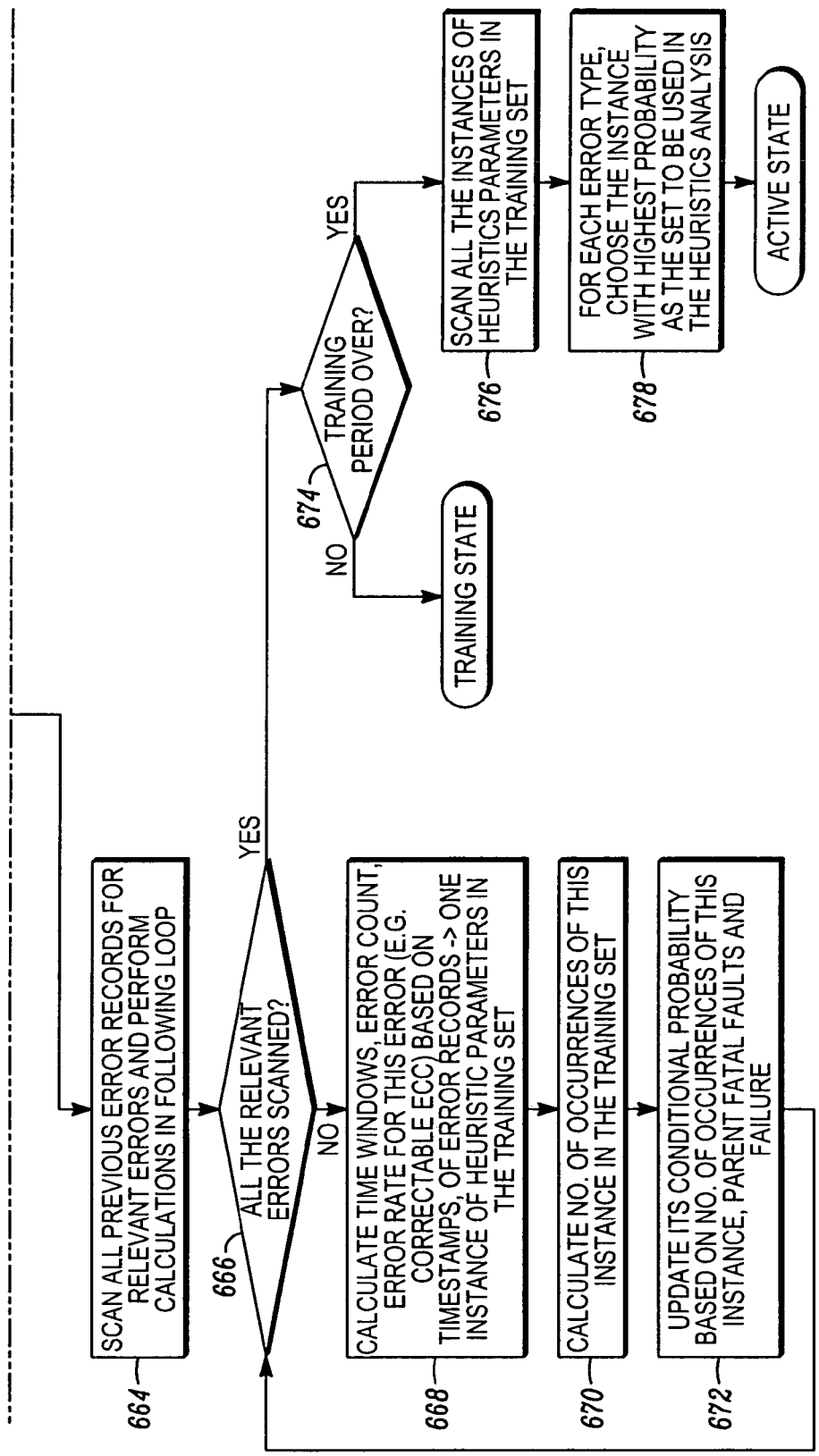
FIG. 7A is a flow diagram for a training mechanism.

An exemplary implementation of training mechanisms 604g of FIG. 7 is shown in FIG. 7A. In this implementation, system builds dataset during the initial time period. This can be done in the lab or field trial environment. In processing block 650, the system records the error information of errors as and when they occur. In block 652, the system records the fault which triggered failure (e.g. processor reset). The number of occurrences of uncorrectable DRAM ECC is incremented in block 654. In decision block 656, system determines whether platform needs to be reset or not on encountering the fault. If yes, it restarts the fault module in block 658 and enters an initiation state. When fault module restarts, in block 660 the system scans the error logs to determine the last fatal fault that led to the system reset and processing continues.

In block 662, the system model is read to determine potential errors that could lead to a fatal fault and in block 664 the system scans error information stored for the potential errors.

If the relevant errors are not yet scanned, as determined in block 666, in blocks 668, 670, 672, the respectively system determines the time window, error count and error rate based on the individual timestamp and its relative difference to the time failure occurred. These parameters (e.g. error type, time window, error rate and error count) calculated become one instance of heuristics parameters in the training dataset and fault module records the number of occurrences of this instance. In block 672, fault module calculates probability of this instance by using number of occurrences of this instance, number of times parent fatal fault (as per system model) occurred and total number of occurrences of critical failure. The probability calculated takes into account the system model graph, probability of a given fatal fault leading to failure, probability of a given error leading to a fatal fault and number of times failure is observed.

Error scan processing is repeated for the potential errors and all the occurrences of the failure during the training period. At the end of training period, as determined in block 674, the system has several instances of heuristics parameters for the various possible errors in the platform and its associated probabilities, as the system scans the instances of heuristics parameters in the training set in block 676. For each error type, in block 678, the system chooses the instance of the heuristics parameters from the training set which had the highest probability of occurrence.

Figure 8:
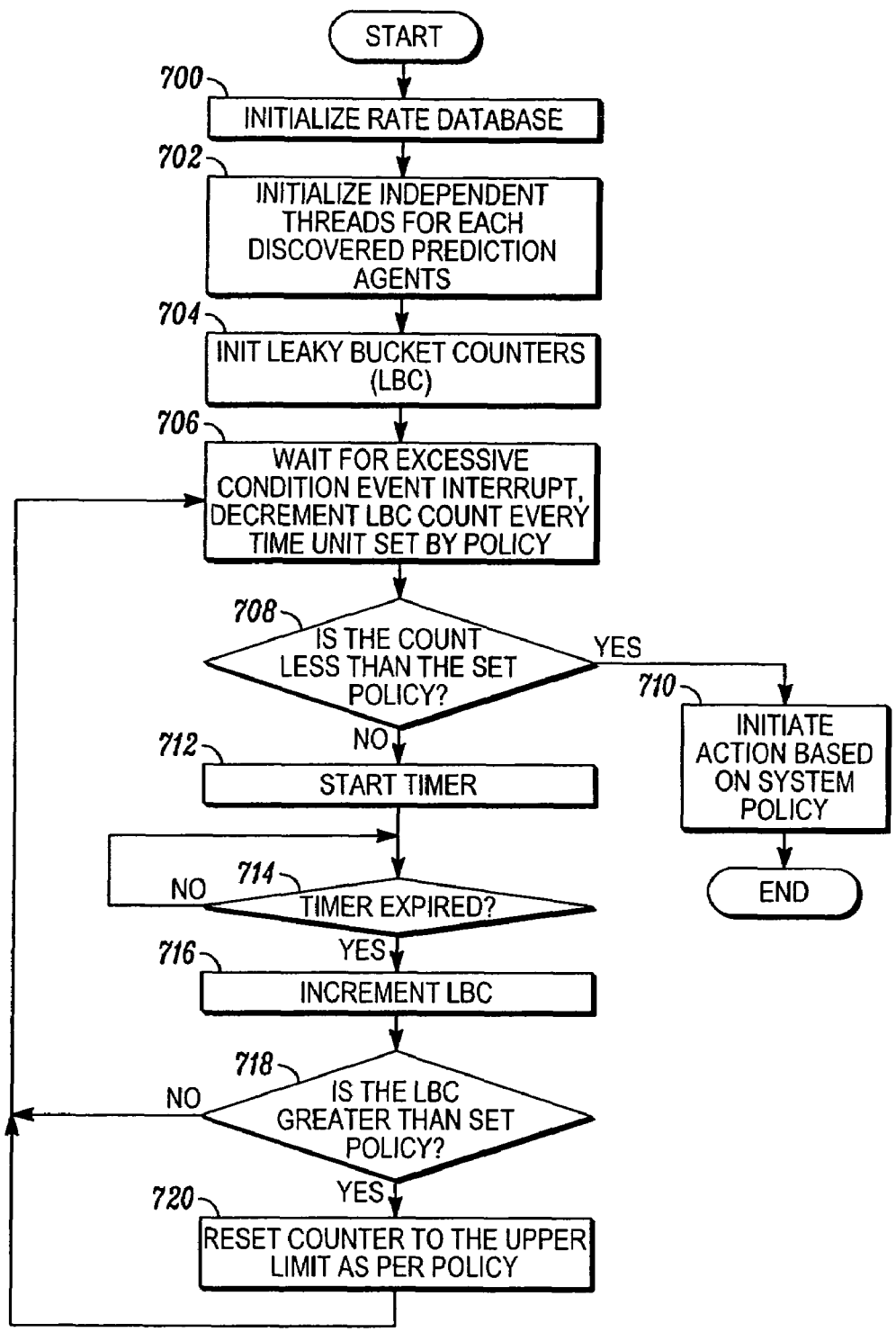
FIG. 8 is a flow diagram of an error counter mechanism.

An exemplary implementation of a leaky bucket counter failure prediction mechanism 604a is shown in FIG. 8. In processing block 700, a database is initialized and in block 702 the processing threads are initialized. In processing block 704, the leaky bucket counters are initialized for the events for which a count is to be maintained and monitored. In block 706, the system waits for an error event, such as an interrupt, and the counters are decremented at predetermined time intervals. In decision block 708, it is determined whether the event count is less than the threshold set in the policy. If so, in block 710, an action is initiated based on the policy. If not, then in block 712 a timer is started to count down a predetermined time interval. In decision block 714 it is determined whether the time is expired by examining the value in the timer. If the timer has not expired the timer value is re-examined in block 714. When the timer has expired, in processing block 716 the leaky bucket counter (LBC) for a given event is incremented. In decision block 718, it is determined whether the LBC value is greater than a predetermined value set in the policy. If so, the LBC is set to its initial value set by the policy in block 720. If not, processing continues in block 706. In summary, a LBC for an event decrements each time an error event is set and at a periodic rate it is incremented. When the LBC underflows a prediction failure alarm is set. The LBC is reset to its upper limit if no stress events occur.

Figure 8A:
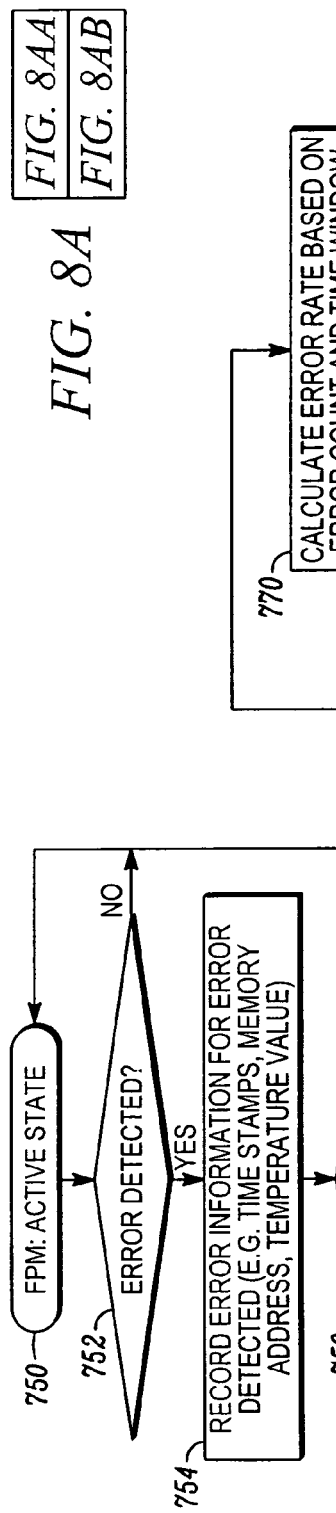
FIG. 8A is a flow diagram of adaptive sliding window based failure prediction mechanism.
Figure 8A:
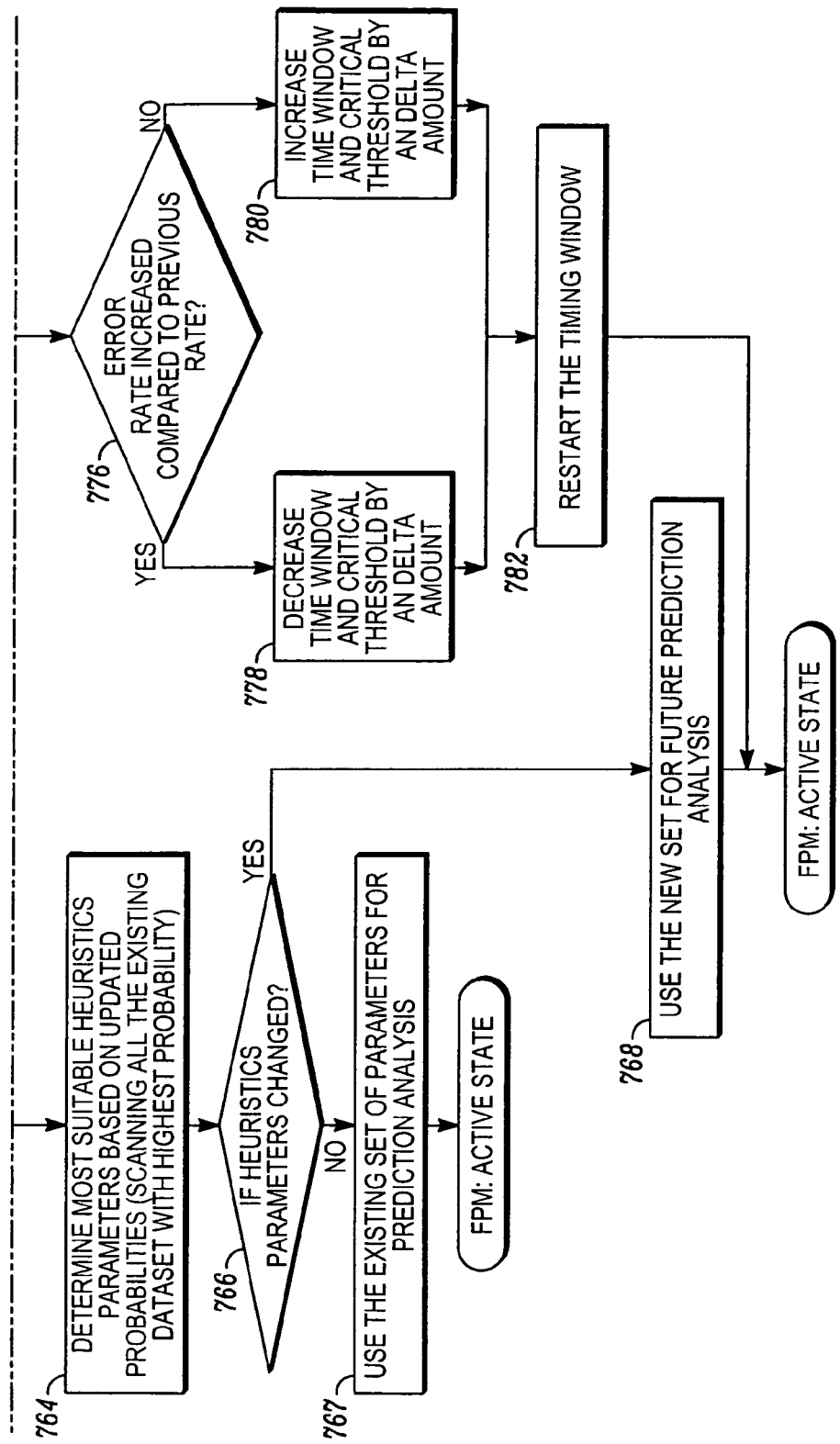

An exemplary implementation of adaptive sliding window based failure prediction mechanism 600 is shown in FIG. 8A. In block 750, system waits for an error to occur. When an error is detected in decision block 752, system records the error information in block 754 and checks whether the current time window has expired in decision block 756. If yes, it checks whether number of errors encountered exceed critical threshold in decision box 758. If error count exceeds threshold, system treats as a failure of the component impacted by this error. In processing block 760, system reads the system model to determine the correlation with other errors and impact of this error on the system health. In block 762, system updates the conditional probability of this error occurrence based on the system model and history of error information collected so far. In block 764, system determines the most suitable heuristics parameters to be used for future prediction analysis by choosing the set of highest probability for the given error(s).

In decision block 766, it checks whether the set of heuristics parameters changed from the currently used set. If yes, the system uses new set for future prediction analysis in block 768. If not, the system uses the existing set of parameters in block 767.

If error count does not exceed the threshold at the end of time window, as determined in block 758, in block 770 the system calculates an error rate based on the error count and the time window. In decision block 772, the system scans existing data sets of heuristics parameters and determines if there is a potential match. If an entry is matched, in block 774 it updates the probability of this data set and scans all the existing dataset for determining the one which has the highest probability. If the system determines that calculated parameters (error rate, count) do not belong to any existing dataset, it is determined in block 776 whether the error rate increased compared to the previous rate. If so, in block 778 the system decreases the time window and thresholds, and if not, increases the time window and thresholds in block 780 In block 782, the timing window is restarted.

Referring again to FIG. 7, the heuristic analysis layer 602 correlates the various reported and analyzed errors and links them with the status of various resources. Exemplary resources include blade, NIC, Media card, processing engine, links, etc. Correlation rules can be defined using the configuration manager 410 (FIG. 5). Some examples of correlation include:

1. If there are single bit DRAM memory errors happening and a rise in temperature near DRAM memory module is being observed, the memory error may be due to increase in this temperature.
2. If there are too many frequent single bit DRAM memory errors and that memory is being used by software components & OS running on host processor, the fault module will link these errors with status of the blade and report it as a potential failure.
3. If there are too many frequent errors in an SRAM memory channel, the fault module will link these errors to the status of the memory channel. If this memory channel is the only one used for fast path, this module will inform this as blade failure event.
4. If there are frequent parity errors on MSF bus, the fault module will link these errors to the status of links using the faulty MSF bus.
5. If there are too many frequent errors in GigE link available in NIC, fault module will link these errors to status of blade if no other link is available in the NIC.
6. If there are link errors being reported and protocol violations reported by MSF related to same set of link, the fault module will link these errors and declare link as faulty.
7. If there are frequent parity errors in scratch memory, the fault module will link it to blade status and inform it to management client.
8. If there is a overflow condition of a given scratch ring which persists for a long time and also watch dog timeout reported by processing engine processing this scratch ring, the fault module will link it to the status of destination processing engine of the given scratch ring as this symptom indicates the destination processing engine is not able to process the packets The failure prediction layer 600 can also include a logging services layer 604 to store the faults reported in a persistent storage. The logging services layer 604 keeps this module transparent to location of persistent storage. It may be resident on the same blade (e.g. flash) or LAN-connected storage. The logging services layer 604 also provides support for proactive notification of failures and retrieval of stored information.

As noted above, error detection hooks (EDHs) are required to enable fault detection and notification. In an exemplary embodiment, the error detection hooks are under compile time flags so that they can be disabled when desired. In another embodiment, can be enabled using an XML (Xtensible Mark up Language) configuration.

Figure 9:
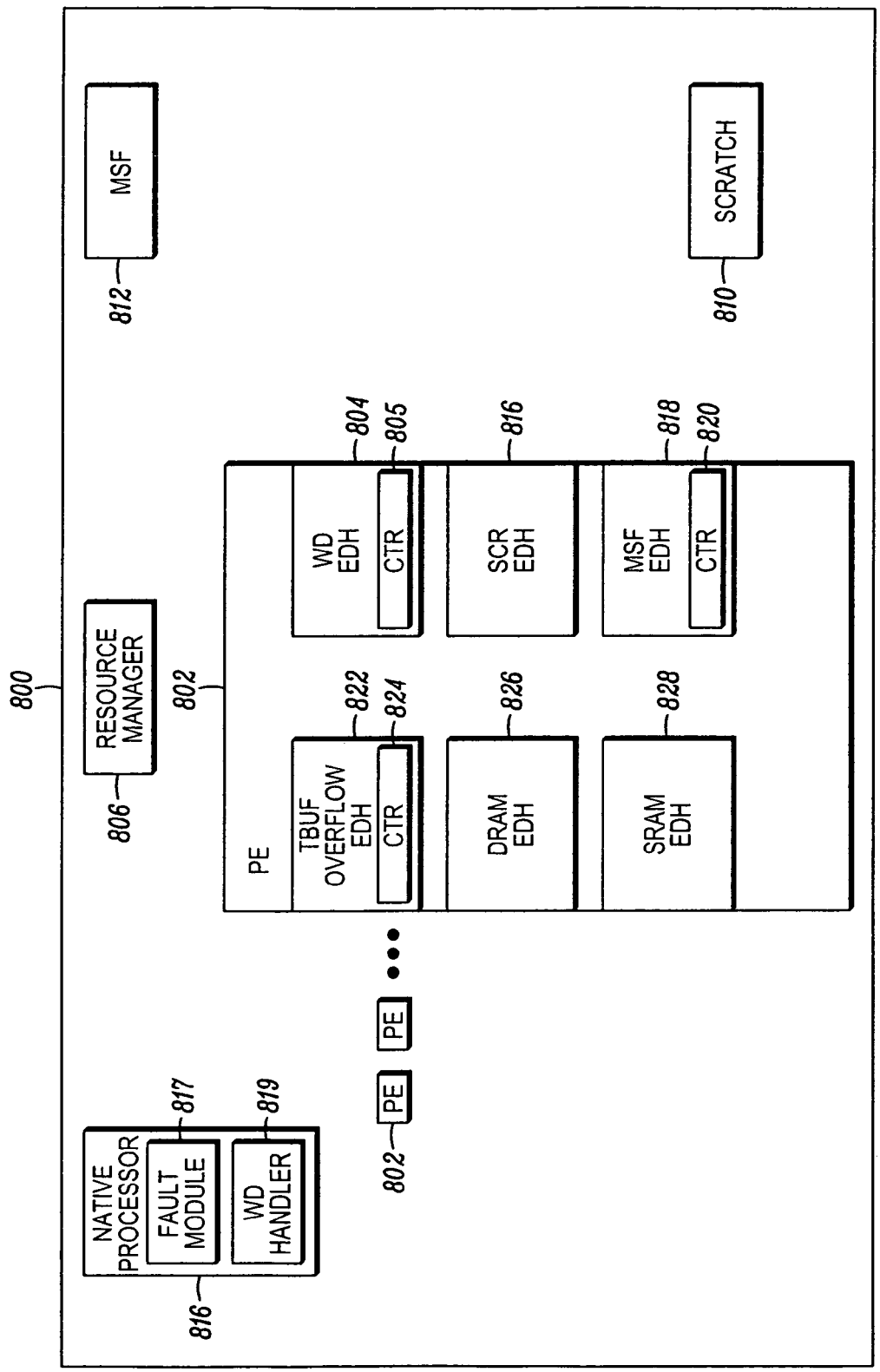
FIG. 9 is a block diagram of a network processor having error detection hooks.

Referring to FIG. 9, a processor system 800 can include processing engines 802 that can include a number of error detection hooks (EDHs), such as a watchdog counter update EDH 804 for a watchdog counter 805. Processing engines run a dispatch loop for processing of packets. A resource manager 806 allocates memory for storing one watch dog counter per processing engine. The processing engines 802 update the watch dog counter 805 each time they enter into the dispatch loop and read the packet/cell from scratch ring memory 810 or MSF 812. The watch dog handler module 814 on a native processor 816, for example, ensures resetting of the watch dog counter periodically so as to avoid overflows. A fault module 817 on the native processor can monitor and/or correlate faults.

In an exemplary embodiment, an EDH 816 for scratch parity generation and checking is implemented using software. Processing engines 802 use scratch memory 810 for exchanging packet meta data information across a data pipeline. Scratch memory 810 are also used for sending/receiving packets to/from core components running on the host processor. In one embodiment, parity generation and checking is supported for scratch memory 810 using software executing on processing engines.

Depending on total size of scratch rings used, the resource manager 806 allocates memory from scratch pad area for storing parity bits calculated for data stored in the scratch memory. When a processing engine 802 places packet meta data in the scratch ring 810, it calculates parity bits for the meta data and stores it in the scratch area allocated for that scratch ring. Note that, in one embodiment, code will implement bit manipulations as scratch read/write are expected to be 4-byte aligned and typically parity bits would be 8-16 bits as packet meta data varies from 2-4 longwords.

When a processing engine 802 reads the packet meta data from the scratch ring 810, it recalculates parity and compares it against the parity bits stored in scratch memory. If a parity mismatch occurs, the processing engine increments the parity error counter and updates other error information (e.g., address).

The processing engine 802 can also include MSF EDHs 818. The processing engine 802 increments appropriate error counters 820 in SRAM on encountering errors in a receive status word, such as parity error, protocol errors, e.g., cell size, and SOP/EOP errors. The error counters will be per port and per error type. Some error types like SOP/EOP errors can be combined into one single error counter.

The processing engine 802 can further include an EDH 822 for TBUF and Buffer free list overflow. When a processing engine 802 allocates a buffer from a given freelist and encounters no buffer available condition, it updates error counter 824 for that freelist. The processing engine needs to check for "no buffer available" condition by checking the value received in transfer register after issuing SRAM Dequeue command.

A processing engine 802 can also include a DRAM EDH 826. As described above, processing engines 802 use DRAM for storing packets being processed in the pipeline. When DRAM single bit ECC error occurs, the processing engine 802 will receive the corrected data while reading. But this data does not get written back into DRAM memory. If the processing engine is performing a write operation, a modified value will still have uncorrected error.

Processing engines 802 wait for an error signal when performing operation on DRAM/SRAM in addition to waiting for signals indicating completion of DRAM or SRAM operations.

The fault module 817 receives an interrupt that an ECC error occurred along with the address information. The fault module 817 sends an error signal to the processing engine 802 indicated by the DRAM controller. On receiving the error signal, the processing engine 802 ignores the packet received and releases resources associated with that packet.

For SRAM parity errors, an SRAM error detection hook 828 can be substantially similar to that implemented for DRAM errors. A processing engine 802 waits for an error signal. The fault module 817 sends an error signal to the appropriate processing engine on receiving an SRAM Parity error interrupt from controller.

Program code for the processing engines 803 can utilize scratch rings 810 for transferring packet meta data between any two given processing engines and also to/from a host control processor 816. The program code can perform a check on scratch ring 810 being full before queuing packet meta data. If the scratch ring 810 is full, it waits for one entry to become free. For detecting overflow conditions, program code increments an error counter each time it encounters scratch ring full condition.

In an exemplary embodiment, the resource manager 806 controls allocation of memory in SRAM/Scratch memory. The fault module requires processing engine and framework components to increment various error counters. The resource manager 806 provides support for allocating memory in SRAM for the various error counters. The allocation of memory is controlled using a configuration file. The resource manager 806 also provides an API to retrieve the physical address of SRAM memory allocated for this purpose. A management client application (e.g. configuration manager) can use the resource manager API to retrieve addresses allocated for error counters and configure it. The resource manager 806 can provide support for allocating scratch memory for storing parity bits of scratch rings 810 used by processing engines 802 and the host processor 816. The resource manager 806 can also provide support for patching symbols of the memory allocated for enabling fault detection in all the processing engines.

As described above, SDRAM/RDRAM memory controllers (e.g., 36, 40 FIG. 2A) support ECC. When a memory controller on a blade, for example, detects a single bit ECC error, it corrects the error for that operation and sends corrected data to the requester of the operation and generates an interrupt to inform about the corrected error and its related information. When a SDRAM/RDRAM memory controller detects double bit error, it generates an interrupt to inform about the uncorrected error and its related information. As described above, the fault module supports informing the processing 802 element of this error condition so that program code can ignore the packet being processed and continue with the processing of next packet in the pipeline. In one embodiment, the memory controller informs the uncorrectable error to the requester of the operation using an error signal.

The SRAM memory controller supports byte parity checking. When the SRAM memory controller detects a parity error, it generates an interrupt.

Referring again to FIG. 5, the fault detection API 404 implements interfaces to detect hardware and software faults in the system. Fault detection mechanisms employed in the framework can either be generic such as watch dog monitoring or it may be specific to a particular device or interface. In the system framework, some fault detection capability may be intrinsic to the implementation where as some other fault detection capability may be options. For example, fault detection is an integral part of handling devices and interfaces. In these cases, the device drivers are required to implement fault detection mechanisms to ensure correct functional behavior. On the other hand, capabilities such as watchdog mechanisms or hardware fault probes are mechanisms that improve reliability while providing visibility into the system at a component or sub-component level.

Depending on the type of fault, it may be detected by active monitoring or by passive monitoring. An example of active monitoring is fault detection of the hash unit. The hash unit may be periodically probed to determine whether it generates expected values. In an exemplary embodiment, the fault detection API 404 triggers a probe mechanism. In cases such as watch dog timers, the program code update counters to indicate that they are operational, and the fault detection API 404 monitors these counters to ensure correct operations.

The configuration management (CM) API 410 is used by the system manager to setup error detection capabilities in the blades. The configuration management API 410 will be invoked typically at startup. It can also be invoked at runtime for disabling the error detections. In general the CM API will provide the following functions:

enable or disable individual error detection functions or a class of error detection functions. Error detection functions are setup to reflect both the system configuration as well as performance and fault detection requirements.

set reporting and various prediction algorithms parameters like time windows, critical thresholds, etc. The failure prediction mechanism relies on these parameters to determine whether an event should be treated as potential failure.

The external interface (EI) API 408 is used by a management application (e.g. System Manager) to be pro-actively informed of various faults detected within a blade. It is also used by the management application to retrieve the fault events stored in the blade. External Interface API 408 can reuse, for example, the Event Services API provided by Carrier Grade Linux, for example. External Interface API 408 provides the following functions:

event notification of blade failure events. The EI (external interface) API provides support for allowing a management application to know when a blade should be declared as faulty since a critical fault has been encountered and persisting. The EI API support providing fault information (like fault type, component ID, fault details, severity) which lead to the blade failure. The failure can be triggered by critical faults defined in correlation rules of CM API.

event notification of a processing engine failure event. The EI API provides support for indicating when a processing engine should be declared as faulty. It provides detailed fault information (e.g., type, processing engine ID, severity).

event notification of a link failure event: The EI API provides support for indicating when a link should be declared as faulty and provides detailed fault information.

event notification of a potential disk related error.

management client to register for various event notifications retrieval of stored fault information Other embodiments are within the scope of the following claims and can include various embodiments and modifications. For example, the fault module can be implemented as a set of native instructions set on the processor optimized for implementing failure prediction mechanisms, the fault module can be implemented as a hardware functional block in an application specific integrated circuit, the fault module can be implemented as a hardware functional block instantiated in a processor core, the fault module can be implemented as a hardware functional block instantiated in a processor chipset, the fault module can be implemented as combination of hardware functional blocks instantiated in a processor core and chipset, the fault module can be implemented as a hardware functional block in a field programmable gate array, and the fault module can be implemented on a dedicated core in a many-core or a multi-core processor architecture. processor architecture.

What is claimed is:

1. A system, comprising:
a processor system including
a plurality of processing engines including error detection hooks, the plurality of processing engines formed from multiple cores on a single die; and
a fault module to monitor error information from the error detection hooks, the fault module including a failure prediction layer coupled to a fault detection layer, which is coupled to the error detection hooks of the processing engines.

2. The system according to claim 1, wherein the processor includes a host processor coupled to the plurality of processing engines.

3. The system according to claim 1, wherein the system further includes a control processor coupled to a host processor.

4. The system according to claim 1, wherein the system further includes a dedicated microcontroller.

5. The system according to claim 1, further including a peripheral device having error detection hooks for monitoring errors in devices and coupled to the fault detection and failure prediction layer.

6. The system according to claim 1, wherein the system further includes one or more memory components having error detection hooks for monitoring memory errors and coupled to the fault detection and the failure prediction layer.

7. The system according to claim 1, wherein the system includes hardware accelerators.

8. The system according to claim 2, wherein fault module executes on the host processor.

9. The system according to claim 4, wherein fault module executes on the dedicated microcontroller.

10. The system according to claim 2, wherein fault module executes on a virtual partition of the host processor.

11. The system according to claim 3, wherein fault module executes on the control processor.

12. The system according to claim 2, wherein the fault module is implemented as a set of native instructions set on the processor optimized for implementing failure prediction mechanisms.

13. The system according to claim 2, wherein the fault module is implemented as a hardware functional block in an application specific integrated circuit.

14. The system according to claim 2, wherein the fault module is implemented as a hardware functional block instantiated in a processor core.

15. The system according to claim 2, wherein the fault module is implemented as a hardware functional block instantiated in a processor chipset.

16. The system according to claim 2, wherein the fault module is implemented as combination of hardware functional blocks instantiated in a processor core and chipset.

17. The system according to claim 2, wherein the fault module is implemented as a hardware functional block in a field programmable gate array.

18. The system according to claim 2, wherein the fault module is implemented on a dedicated core in a many-core or a multi-core processor architecture.

19. The system according to claim 1, wherein fault module implements failure prediction capabilities to determine likelihood of critical failure of components in the system.

20. The system according to claim 1, wherein fault module includes error correlation.

21. A method of managing faults in a processor system, comprising:
monitoring errors detected in components of the processor system using error detection hooks; and
analyzing errors in a fault module to predict future failure of the components using a failure prediction layer coupled with a fault detection layer.

22. The method according to claim 21, wherein the fault module runs on a processor coupled to a plurality of processing engines formed from multiple cores on a single die having error detection hooks.

23. The method according to claim 21, further including correlating the errors to avoid false alarms and isolate root cause of a failure.

24. The method according to claim 21, wherein the fault module includes a training mechanism to build a data set of errors potentially leading to system failure and to determine suitable heuristics parameters to be used in failure prediction layer.

25. The method according to claim 24, wherein the heuristics parameters include one or more of error rates, timing windows, thresholds, conditional probabilities.

26. The method according to claim 25, wherein the processor includes a host processor coupled to the plurality of processing engines.

27. The method according to claim 22, wherein the processor includes a control processor coupled to a host processor.

28. The method according to claim 22, wherein the processor includes a dedicated microcontroller.

29. The method according to claim 21, wherein the system includes further components as one or more of memory, interface circuit cards, and peripheral devices.

30. An article, comprising:
a storage medium having stored thereon instructions that when executed by a machine result in the following:
running a fault module on a processor coupled to a processing engines formed from multiple cores on a single die having error detection hooks; and
monitoring error information by the error module from error detection hooks, the fault module including a failure prediction layer coupled to a fault detection layer, which is coupled to the error detection hooks of the processing engines.

31. The article according to claim 30, wherein the processor includes a host processor coupled to the plurality of processing engines.

32. The article according to claim 30, wherein the processor includes a control processor coupled to a host processor.

33. The article according to claim 30, wherein the processor includes a dedicated microcontroller.

34. A system, comprising:
a host processor having error detection hooks;
processing engines on multiple cores on a single die coupled to the host processor, the processing engines having error detection hooks;
a microcontroller coupled to the host processor and the processing engines, the microcontroller having a fault module to run on the microcontroller to collect error information from the error detection hooks;
wherein the fault module includes a failure prediction layer coupled to a fault detection layer.

35. The system according to claim 34, wherein the fault detection layer includes an error handler layer.

36. The system according to claim 35, wherein the fault detection layer includes a platform hardware interface layer.

37. The system according to claim 34, wherein the failure prediction layer includes a heuristics layer to predict component failures.

* * * * *